(12) United States Patent
Testa et al.

(10) Patent No.: US 10,390,115 B2
(45) Date of Patent: Aug. 20, 2019

(54) OPTICAL SWITCH, AN OPTICAL NETWORK NODE AND AN OPTICAL NETWORK

(71) Applicant: Telefonaktiebolaget LM Ericsson (publ), Stockholm (SE)

(72) Inventors: Francesco Testa, Pisa (IT); Alberto Bianchi, Pisa (IT); Marco Romagnoli, Pisa (IT); Vito Sorianello, Pisa (IT); Philippe Velha, Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/544,514

(22) PCT Filed: Jan. 22, 2015

(86) PCT No.: PCT/EP2015/051289
§ 371 (c)(1),
(2) Date: Jul. 18, 2017

(87) PCT Pub. No.: WO2016/116162
PCT Pub. Date: Jul. 28, 2016

(65) Prior Publication Data
US 2018/0020272 A1    Jan. 18, 2018

(51) Int. Cl.
*H04J 14/02* (2006.01)
*H04Q 11/00* (2006.01)

(52) U.S. Cl.
CPC ...... *H04Q 11/0005* (2013.01); *H04J 14/0212* (2013.01); *H04Q 2011/0035* (2013.01); *H04Q 2011/0039* (2013.01)

(58) Field of Classification Search
CPC ....... H04Q 11/0005; H04Q 2011/0039; H04Q 2011/0035; H04J 14/0212
See application file for complete search history.

(56) References Cited

U.S. PATENT DOCUMENTS

2002/0039470 A1    4/2002  Braun et al.
2004/0013355 A1*   1/2004  Margalit ............ G02B 6/29319
                                                  385/27

(Continued)

FOREIGN PATENT DOCUMENTS

WO    WO-0072063 A1 *  11/2000   ......... G02B 6/12007

OTHER PUBLICATIONS

Rakshit et al, Design of Micro-Ring Resonator Based All Optical Parity Generator and Checker Circuit, Optics Communications 303, pp. 30-37, 2013.*

(Continued)

*Primary Examiner* — Leslie C Pascal
(74) *Attorney, Agent, or Firm* — Leffler Intellectual Property Law, PLLC

(57) ABSTRACT

There is provided an optical switch. The optical switch comprises a first optical waveguide, a second optical waveguide, a first optical ring resonator and a second optical ring resonator. The first optical ring resonator is arranged between the first optical waveguide and the second optical waveguide, wherein the first optical ring resonator is capable of coupling an optical signal travelling along the first optical waveguide in a first direction to the second optical waveguide such that the optical signal travels in a second direction along the second optical waveguide. The second optical ring resonator is arranged between the first optical waveguide and the second optical waveguide; wherein the second optical ring resonator is capable of coupling an optical signal travelling along the first optical waveguide in the first direction to the second optical waveguide such that the optical signal travels in a third direction along the second optical waveguide opposite to the second direction. There is also provided an optical network node and an optical network.

14 Claims, 5 Drawing Sheets

(56) References Cited

U.S. PATENT DOCUMENTS

2015/0168803 A1* 6/2015 Xu .................. G02F 1/353
359/332
2016/0204892 A1* 7/2016 Testa ................. H04J 14/0204
398/48

OTHER PUBLICATIONS

PCT International Search Report, dated Oct. 16, 2015, in connection with International Application No. PCT/EP2015/051289, all pages.
PCT Written Opinion, dated Oct. 16, 2015, in connection with International Application No. PCT/EP2015/051289, all pages.
Linjie Zhou et al., Silicon Electro-Optic Switches using Microring Resonators with Phase-Tunable Feedback, 2006 3rd IEEE International Conference on Group IV Photonics, Sep. 13-15, 2006, Ottawa, Ont., Canada, IEEE, Piscataway, NJ, USA, pp. 243-245.
A W Poon et al., Cascaded Microresonator-Based Matrix Switch for Silicon On-Chip Optical Interconnection, Proceedings of the IEEE, New York, USA, vol. 97, No. 7, Jul. 1, 2009, pp. 1216-1238.
JDSU, A Performance Comparison of WSS Switch Engine Technologies, May 2009, pp. 1-24.
P. Velha et al., Ultra-high-reflectivity photonic-bandgap mirrors in a ridge SOI waveguide, New Journal of Physics 8, Sep. 22, 2006, 14 pages.

* cited by examiner

OPTICAL SWITCH, AN OPTICAL NETWORK NODE AND AN OPTICAL NETWORK

TECHNICAL FIELD

The present invention relates to an optical switch, an optical network node and an optical network.

BACKGROUND

Optical networks are commonly used in metro and core networks. However, optical networks are also now being considered for use in radio access networks, as mobile traffic demand increases and the structure of radio access networks is changing.

It is proposed that each radio access network (RAN) comprise a plurality of remote radio units (RRUs), distributed geographically, and a pool of baseband processing units, located at a centralised location, for example at a data centre a few kilometers away from each of the RRUs. This arrangement has the advantage that it allows the use of computational resources to be optimised. Optical networking, and in particular wavelength-division-multiplexing (WDM) optical networking, is considered a very promising technology for connecting the RRUs to the baseband processing unit pool.

However, a barrier to using WDM optical networks in radio access networks is that WDM networks use optical switches based on Wavelength Selective Switching devices (WSSs), which are based on complex free space optics. This means that WSS switches are costly, have a large spatial footprint and are difficult to mass produce. These are critical factors for radio access networks, which have lower throughput and shorter inter-node distances than metro or core networks.

An alternative to using WSS devices is to use fixed wavelength add drop devices (FOADM). A FOADM may simply comprise a cascade of thin film filters. However, use of this type of optical device has the disadvantage that complex inventory handling is required, since a FOADM with a different combination of add drop wavelengths is required at each node. Further, since FOADMs are passive devices they cannot be automatically reconfigured for example in the event of an optical fibre cut to provide restoration of the optical network.

Optical switches based on optical ring resonators have also been proposed for use in optical networks. For example, an optical switch using optical ring resonators is described in A. W. Poon, L. Xianshu, X. Fang and C. Hui "Cascaded Microresonator-Based Matrix Switch for Silicon On-Chip Optical Interconnection", IEEE Proceeding 97, 1216-1238 (2009). The use of these optical switches, which may be manufactured using silicon photonics, has the advantage that these devices may have lower power consumption, higher minaturisation, and may be easier to mass produce at lower cost than other types of optical switch.

SUMMARY

The present invention aims to provide an improved optical switch suitable for use in optical networks such as radio access networks.

According to the present invention, there is provided an optical switch.

The optical switch comprises a first optical waveguide, a second optical waveguide, a first optical ring resonator and a second optical ring resonator. The first optical ring resonator is arranged between the first optical waveguide and the second optical waveguide, wherein the first optical ring resonator is capable of coupling an optical signal travelling along the first optical waveguide in a first direction to the second optical waveguide such that the optical signal travels in a second direction along the second optical waveguide. The second optical ring resonator is arranged between the first optical waveguide and the second optical waveguide, wherein the second optical ring resonator is capable of coupling an optical signal travelling along the first optical waveguide in the first direction to the second optical waveguide such that the optical signal travels in a third direction along the second optical waveguide opposite to the second direction.

It should be noted that the terms "first", "second" and "third" are being used merely for naming purposes. The "second" and "third" direction could alternatively be referred to as a "first" and "second" direction through the second optical waveguide.

In embodiments of the present invention, at least one of the first optical waveguide and the second optical waveguide has a curved configuration such that the second optical ring resonator is capable of coupling an optical signal travelling along the first optical waveguide in the first direction to the second optical waveguide such that the optical signal travels in a third direction along the second optical waveguide opposite to the second direction.

In embodiments of the present invention, the second optical ring resonator is positioned at an opposite side of the first optical waveguide or the second optical waveguide than the first optical ring resonator.

In some embodiments of the present invention, the second optical ring resonator is capable of coupling an optical signal travelling along the first optical waveguide in the first direction to the second optical waveguide in an opposite rotational sense than the first optical ring resonator, whereby the optical signal travels in a third direction along the second optical waveguide opposite to the second direction.

Advantageously, embodiments of the present invention provide an optical switch capable of switching an optical signal from a first optical waveguide to a second optical waveguide, to travel in a first direction or a second direction, opposite to the first direction, along the second optical waveguide. This functionality may for example be advantageous in optical networks in order to provide restoration in the event of an optical link failure. However, this type of optical switch may also be advantageous in other applications.

Moreover, embodiments of the present invention have the advantage that they may reduce the amount of power required by, and the size of, the optical switch in comparison to other designs for such an optical switch. In particular, the arrangement of the optical switch advantageously means that only two optical ring resonators and two optical waveguides are required to implement the optical switch. Thus, the optical switch may be mass producible, at lower cost and higher yield than other optical switches with similar functionality.

In a preferred embodiment of the present invention, the first optical ring resonator may have an active state in which it is configured to couple an optical signal travelling in the first direction along the first optical waveguide to the second optical waveguide and an inactive state in which it is configured not to couple the optical signal. The optical switch may further comprise a first control element configured to cause the first optical ring resonator to switch between the active and inactive states in response to a control signal. Thus, advantageously, the optical switch may be automatically reconfigurable.

The first control element may for example comprise a heating element operable to change the temperature of the first optical ring resonator.

In preferred embodiments of the present, the second optical ring resonator is provided downstream of the first optical ring resonator in the first direction along the first optical waveguide.

Optionally, in some embodiments of the present invention, the second optical ring resonator may have an active state in which it is configured to couple an optical signal travelling in the first direction along the first optical waveguide to the second optical waveguide and an inactive state in which it is configured not to couple the optical signal. The optical switch may further comprise a second control element configured to cause the second optical ring resonator to switch between the active and inactive states in response to a control signal.

Furthermore, in this case, the optical switch may comprise control circuitry configured to cause the second optical ring resonator to switch between its active and inactive states in accordance with the switching of the first optical ring resonator between its active and inactive states.

The second control element may comprise a heating element operable to change the temperature of the second optical ring resonator.

In embodiments of the present invention, the first optical waveguide comprises an input for receiving an optical signal to travel in the first direction along the first optical waveguide.

In embodiments of the present invention, the second optical waveguide has a first output for outputting an optical signal travelling in the second direction along the second optical waveguide, and a second output for outputting an optical signal travelling in the third direction along the second optical waveguide.

The first output may be spaced from the second output. For example, the first output may be provided at a first end of the second optical waveguide and the second output may be provided at an opposite end of the second optical waveguide.

Alternatively, the first output and the second output may comprise a common output at an intermediate position along the second optical waveguide.

In this case, the optical switch may further comprise a third optical waveguide and a third optical ring resonator. The third optical ring resonator is arranged between the second optical waveguide at the common output and the third optical waveguide. The third optical ring resonator is capable of coupling an optical signal travelling in the second direction along the second optical waveguide to the third optical waveguide such that the optical signal travels in a fourth direction along the third optical waveguide. The third optical ring resonator is also capable of coupling an optical signal travelling in the third direction along the second optical waveguide to the third optical waveguide such that the optical signal travels in a fifth direction along the third optical waveguide opposite to the fourth direction.

In preferred embodiments of the present invention, the optical switch is made from a semiconductor material.

According to the present invention, there is also provided an optical network node comprising the optical switch. There is also provided an optical network comprising the optical switch.

DESCRIPTION OF THE DRAWINGS

Embodiments of the present invention will now be described with reference to the drawings in which.

DETAILED DESCRIPTION OF EMBODIMENTS OF THE PRESENT INVENTION

Figure 1A:
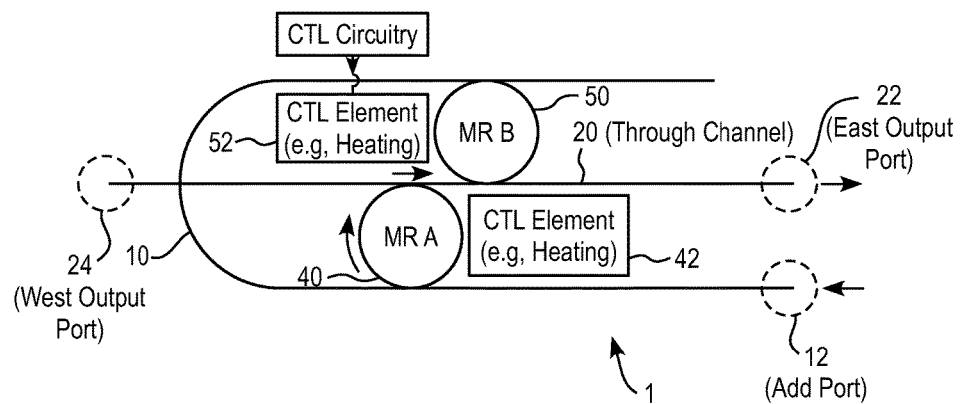
FIG. 1 is a diagram of an optical switch according to a first embodiment of the present invention.

FIG. 1 is a diagram of an optical switch 1 according to a first embodiment of the present invention.

The optical switch 1 comprises a first optical waveguide 10. In this example, the first optical waveguide 10 has an input 12 suitable for receiving an optical signal to travel in a first direction through the optical waveguide 10, as indicated by the arrow. In this example, the input 12 is provided at one end of the first optical waveguide 10 in the form of a port. However, it should be appreciated that the input 12 could alternatively be provided spaced from the end of the first optical waveguide 10. For example, the optical signal could be coupled to the first optical waveguide by an optical ring resonator from another optical waveguide.

The optical switch 1 also comprises a second optical waveguide 20. In this example, the second optical waveguide 20 comprises a first output 22 suitable for outputting an optical signal traveling in a first direction through the second optical waveguide 20. This "first" direction will be referred to as a "second" direction so as to avoid confusion with the "first" direction referred to in respect of the first optical waveguide. The second optical waveguide 20 also comprises a second output 24 suitable for outputting an optical signal travelling in a second direction through the second optical waveguide 20, which will be referred to from now on as a "third" direction. This "third" direction is opposite to the "second" direction. In this example, the first output 22 is spaced from the second output 24, and each output 22, 24 is provided at a respective end of the second optical waveguide 20, in the form of a port.

The optical switch 1 further comprises a first optical ring resonator 40 arranged between the first optical waveguide 10 and the second optical waveguide 20. In this example, the first optical ring resonator 40 is arranged between a first side of the first optical waveguide 10 and a first side of the second optical waveguide 20. The first optical ring resonator 40 is arranged such that it is capable of coupling an optical signal travelling along the first optical waveguide 10 from the input 12 (i.e. in the first direction), to the second optical waveguide 20. In particular, as illustrated in FIG. 1a, in this example, when the first optical ring resonator 40 couples the optical signal to the second optical waveguide 20, the optical signal travels in a clockwise direction around the first optical ring resonator 40. The optical signal is then coupled by the first optical ring resonator 40 to the second optical waveguide 20 so as to travel in the "second" direction through the second optical waveguide 20, to the first output 22.

The optical switch further comprises a second optical ring resonator 50. This optical ring resonator 50 is also provided between the first optical waveguide 10 and the second optical waveguide 20. However, in this example, the second optical ring resonator 50 is arranged at an opposite side of the second optical waveguide 20 than the first optical ring resonator 40. The second optical ring resonator 50 is provided between the first side of the first optical waveguide 10 and a second side of the second optical waveguide 20. The first optical waveguide 10 is provided in a curved configuration (i.e. at least a portion of the first optical waveguide 10 is curved), so that this arrangement can be achieved.

Figure 1B:
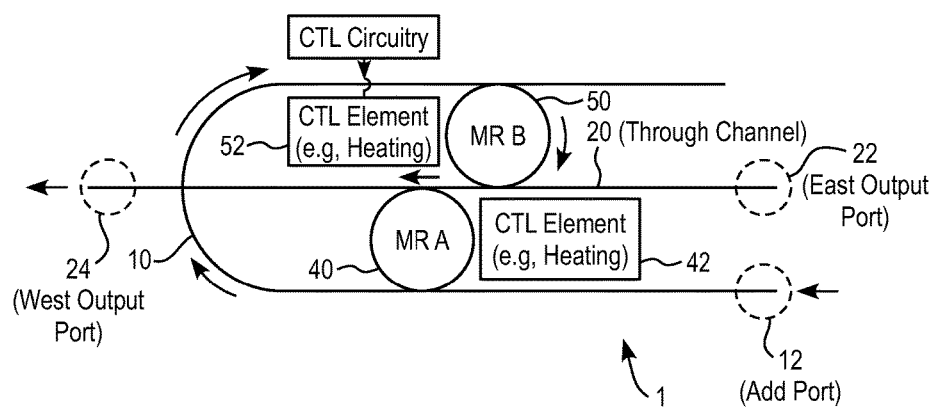

As illustrated in FIG. 1b, the second optical ring resonator 50 is therefore capable of coupling an optical signal travelling through the first optical waveguide 10 from the input 12 (i.e. travelling in the first direction) to the second optical waveguide 20, to travel in the "third" direction, opposite to the "second" direction, towards the second output 24. Note that, when an optical signal from the input 12 is coupled by the second optical ring resonator 50, the optical signal also travels in a clockwise direction around the second optical ring resonator 50, before being coupled to the second optical waveguide 20 to travel in the "third" direction.

In this example, the second optical ring resonator 50 is provided downstream of the first optical ring resonator 40. Thus, the second optical ring resonator 50 can only couple an optical signal from the input 12 to the second optical waveguide 20, if the optical signal is not coupled by the first optical ring resonator 50.

In this example, the first optical ring resonator 40 has an active state in which it is configured to couple an optical signal travelling from the input 12 along the first optical waveguide to the second optical waveguide, as described above. In this state, the first optical ring resonator 40 can be said to be in resonance with the wavelength of the optical signal. The first optical ring resonator 40 also has an inactive state in which it is configured not to couple the optical signal. In this state, the first optical ring resonator 40 can be said to be set off resonance in respect of the wavelength of the optical signal.

In this example, the optical switch 1 further comprises a first control element 42 configured to cause the first optical ring resonator 40 to switch between the active and inactive states in response to a control signal. This first control element 42 may be a heater arranged, for example above the first optical ring resonator 40, so as to be operable to change the temperature of the first optical ring resonator 40. This allows the first control element 42 to change the refractive index of the first optical ring resonator 40, and thus its resonance.

In this example, the second optical ring resonator 50 also has an active state in which it is configured to couple an optical signal travelling in the first direction along the first optical waveguide to the second optical waveguide and an inactive state in which it is configured not to couple the optical signal. As above, in the respective states the second optical ring resonator 50 may be said to be on resonance or off resonance with respect to the wavelength of the optical signal.

In this example, the optical switch 1 further comprises a second control element 52 configured to cause the second optical ring resonator 50 to switch between the active and inactive states in response to a control signal. Again, the second control element 52 may comprise a heating element, for example arranged above the second optical ring resonator 50, operable to change the temperature of the first optical ring resonator and so its resonance.

In this example, the optical switch 1 comprises control circuitry (not shown) configured to cause the second optical ring resonator 50 to switch between its active and inactive states in accordance with the switching of the first optical ring resonator 40 between its active and inactive states. When the first optical ring resonator 40 is set to its active state, the second optical ring resonator is set to its inactive state (and vice versa). It can be seen that this coordination is necessary in this first embodiment of the present invention, since the second optical ring resonator 50 is provided, with respect to the second optical waveguide 30, downstream of the first optical ring resonator 40 in the "second" direction. Thus, if the second optical ring resonator 50 were not turned off, when the first optical ring resonator 40 couples an optical signal to the second optical waveguide 20, the second optical ring resonator 50 could couple the optical signal, and thus prevent its output from the second output 24.

However, it should be appreciated that if the second optical ring resonator 50 were on the other side of the first optical ring resonator 40, being able to switch the second optical ring resonator 50 off, and at least in synchronisation with the first optical ring resonator 40, would not be necessary.

FIG. 2 shows a further example of an optical switch 2 embodying of the present invention. The optical switches 1, 2 are similar, and the same reference numerals are used in FIG. 2 for like parts.

The main differences of this second embodiment in comparison to the first embodiment described above are as follows:

Firstly, instead of being provided on respective sides of the second optical waveguide 20, the first and second optical ring resonators 40, 50 are provided on opposite sides of the first optical waveguide 10. In this example, this is achieved by the first optical waveguide 10 being in a curved configuration, and in particular in a loop like configuration.

Figure 2A:
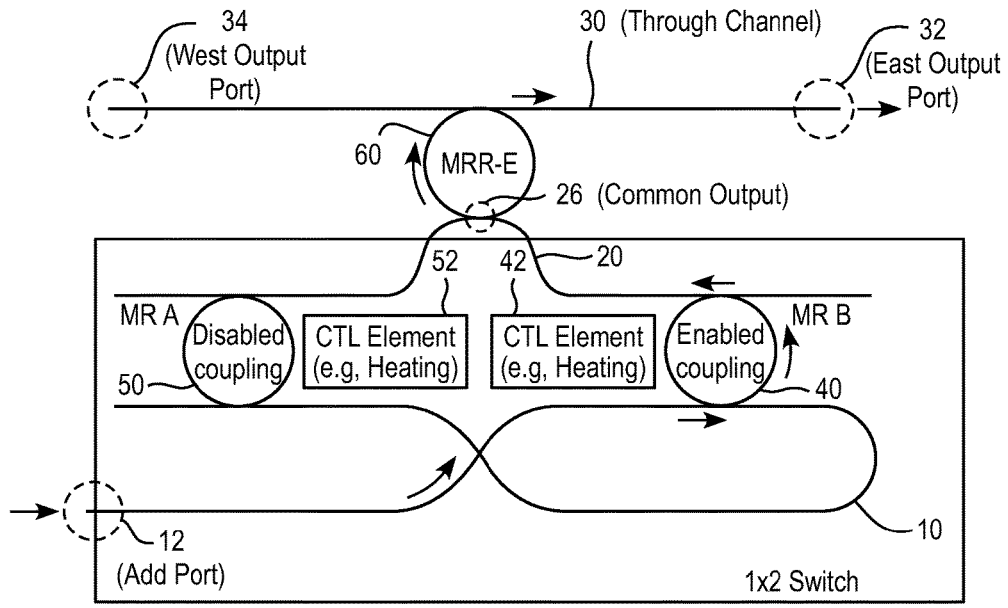
FIG. 2 is a diagram of an optical switch according to a second embodiment of the present invention.
Figure 2B:
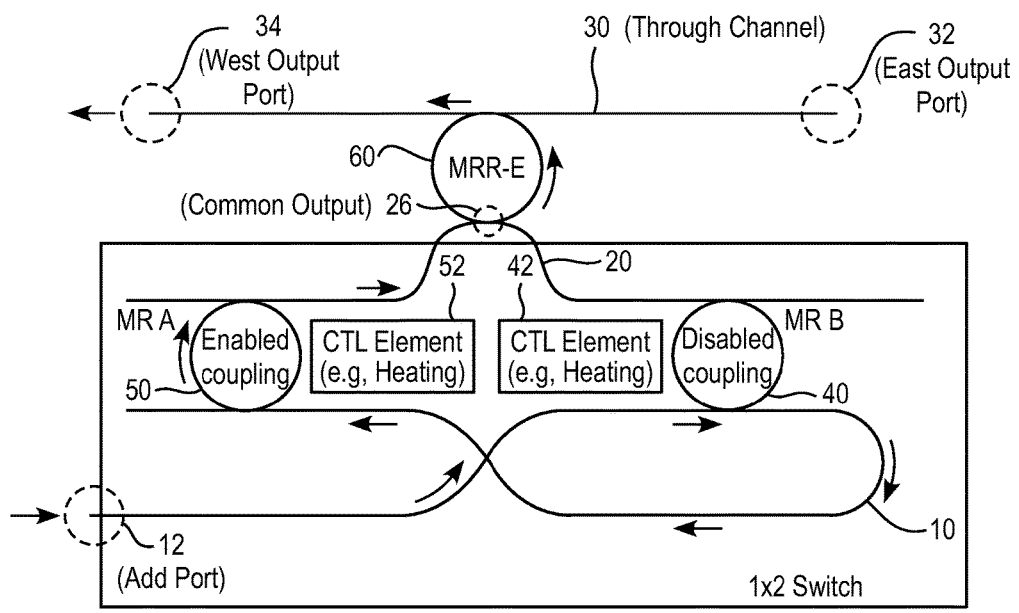

It should be noted that this arrangement means that the second optical ring resonator 50 is capable of coupling an optical signal from the input 12 such that the optical signal travels in an opposite rotational sense around the second optical ring resonator 40 in comparison to the first optical ring resonator 50. In particular, as shown in FIG. 2a, in this example, when the first optical ring resonator 40 couples an optical signal from the input 12, the optical signal travels in an anticlockwise direction around the first optical ring resonator 40. On the other hand, as shown in FIG. 2b, when the second optical ring resonator 50 couples an optical signal from the input 12, the optical signal travels in a clockwise direction around the second optical ring resonator 50.

Again, in this example, the first optical ring resonator 40 comprises a control element 42, as described above, configured to switch the first optical ring resonator 40 between an active state (shown in FIG. 2a) in which the first optical ring resonator 40 is configured to couple an optical signal from the input 12 and an inactive state (shown in FIG. 2b) in which the first optical ring resonator 40 is configured not to couple the optical signal. If the optical signal is not coupled by the first optical ring resonator 40, the second optical ring resonator 50 may couple the optical signal to the second optical waveguide 20. It should be noted that in this embodiment the optical switch 2 need not (although optionally may) comprise a second control element 52 to switch the second optical resonator 50 between an active and inactive state as described above.

Secondly, in this embodiment, the first output 22 and the second output 24 are not spaced apart, but are provided at a common output 26 along the second optical waveguide 20 intermediate the first optical ring resonator 40 and the second optical ring resonator 50.

In this example, the optical switch 2 further comprises a third optical waveguide 30 and a third optical ring resonator 60. This third optical ring resonator 60 is arranged between the second optical waveguide, at the common output 26, and the third optical waveguide 30. This means that, as shown in FIG. 2a, the third optical ring resonator 60 is capable of coupling an optical signal travelling in the second direction along the second optical waveguide 20 to the third optical waveguide 30 such that the optical signal travels in a fourth direction along the third optical waveguide 30. This also means that, as shown in FIG. 2b, the third optical ring resonator 60 is also capable of coupling an optical signal travelling in the third direction along the second optical waveguide 20 to the third optical waveguide 30 such that the optical signal travels in a fifth direction along the third optical waveguide 30 opposite to the fourth direction.

The third optical waveguide 30 may comprise a third output 32 and a fourth output 34, for example at the ends of the third optical waveguide 30.

Figure 3A:
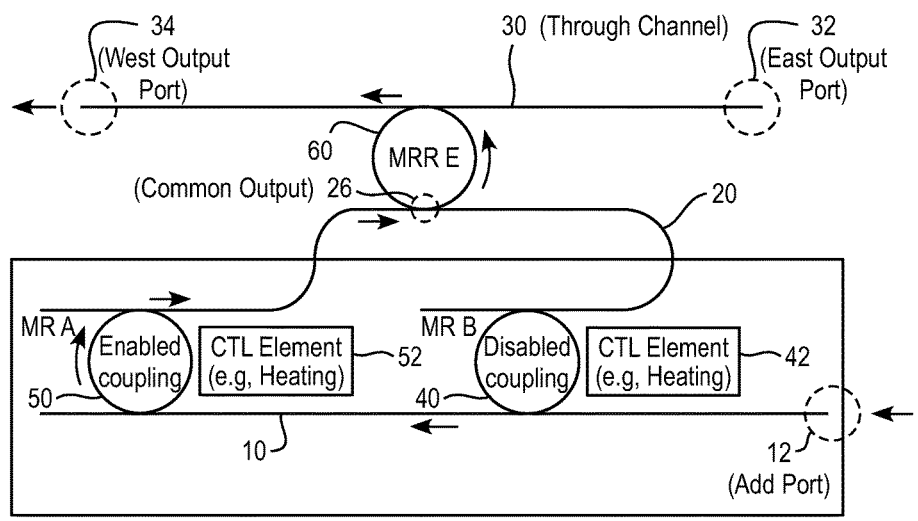
FIG. 3 is a diagram of an optical switch according to a third embodiment of the present invention.
Figure 3B:
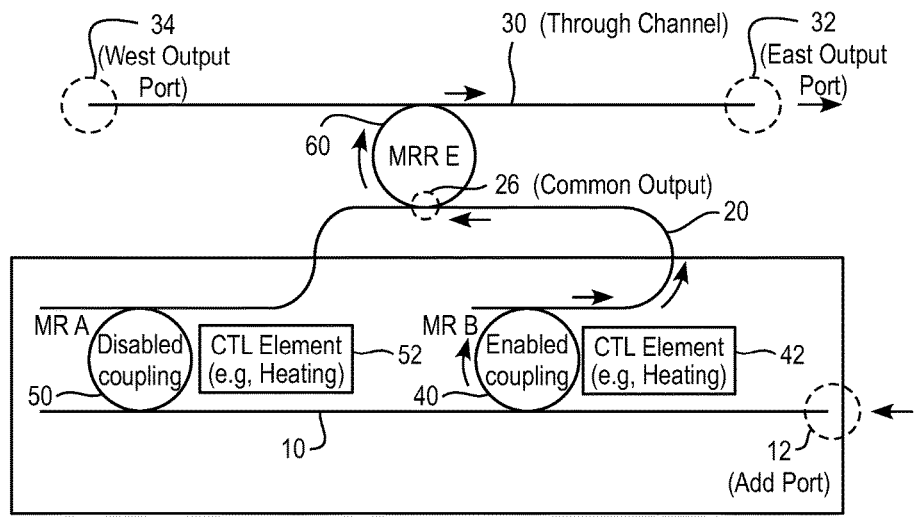

FIG. 3 shows a further example of an optical switch 3 according to a third embodiment of the present invention. Again, the same reference numerals are used in respect of like components. This embodiment is the same as the second embodiment, except that the second optical ring resonator 50 is provided at an opposite side of the second optical waveguide 20, instead of the first optical waveguide 10, than the first optical ring resonator 40. And, unlike the first embodiment, it is the second optical waveguide 20 which is provided in a curved configuration (in particular a loop like configuration) in order to achieve this arrangement. It is further noted that in this example the optical signal will travel in the same rotational direction (in this example in a clockwise direction) around the first optical ring resonator 40 and the second optical ring resonator 50.

Each of the optical switches 1, 2, 3 may be made out of a semiconductor material, for example silicon. Furthermore, it should be appreciated that the optical switches 1, 2, 3 may be part of a larger optical switch and or an integrated circuit. The optical switches 1, 2, 3 may for example be formed on a chip.

Figure 4:
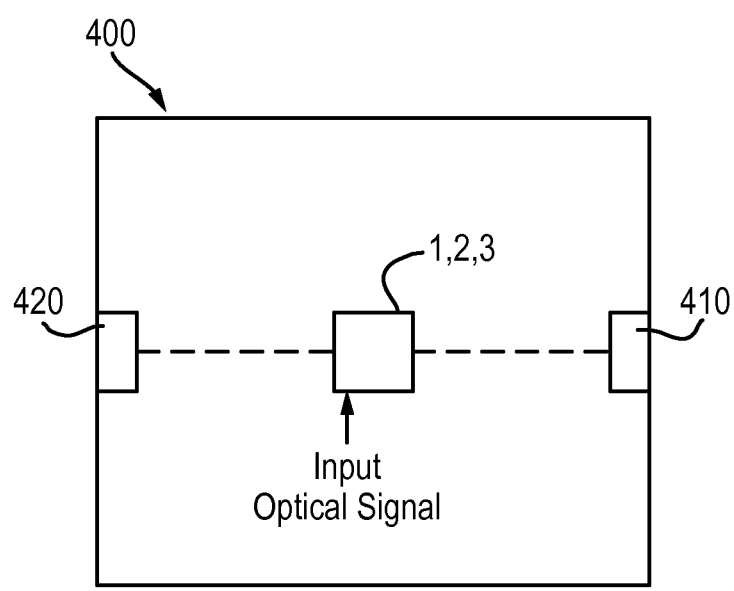
FIG. 4 illustrates an optical network node.

FIG. 4 shows an example of an optical node 400 suitable for use in an optical communications network. This node 400 may comprise a number of output ports 410 from which the node may be connected by optical links to other nodes. In this example, an EAST port 410 and a WEST port 420 is shown. The node 400 also comprises one or more optical switches 1, 2, 3 as described above with respect to FIGS. 1 to 3. For example, with respect to the first embodiment, the first and second output ports 22, 24 of the optical switch 1 may be coupled to the EAST and WEST ports 410, 420 respectively. For example, with respect to the second and third embodiments, the third and fourth ports 32, 34 of the optical switch 2, 3 may be coupled to the EAST and WEST ports 410 respectively.

Figure 5A:
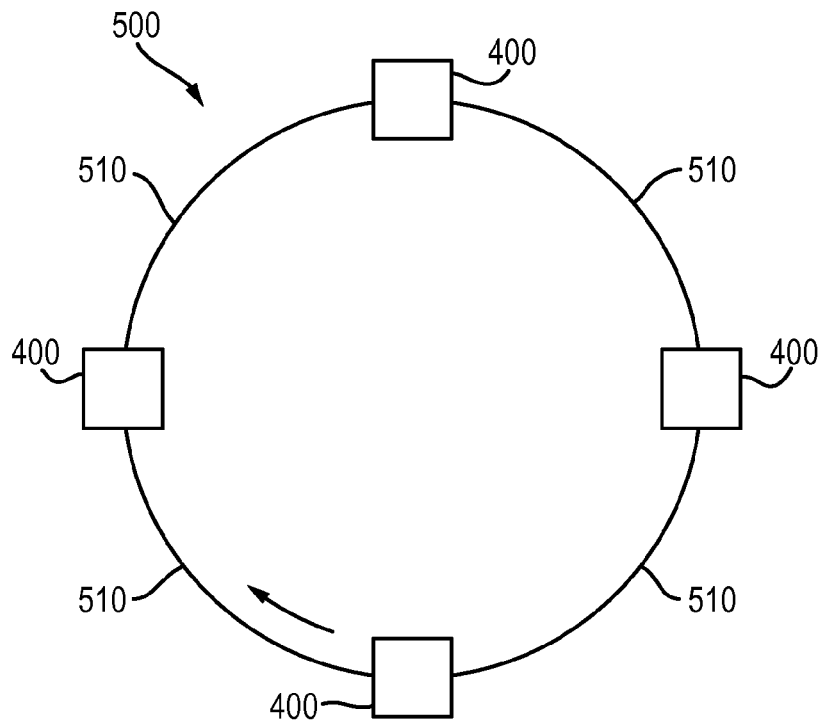
FIG. 5 illustrates an optical network.
Figure 5B:
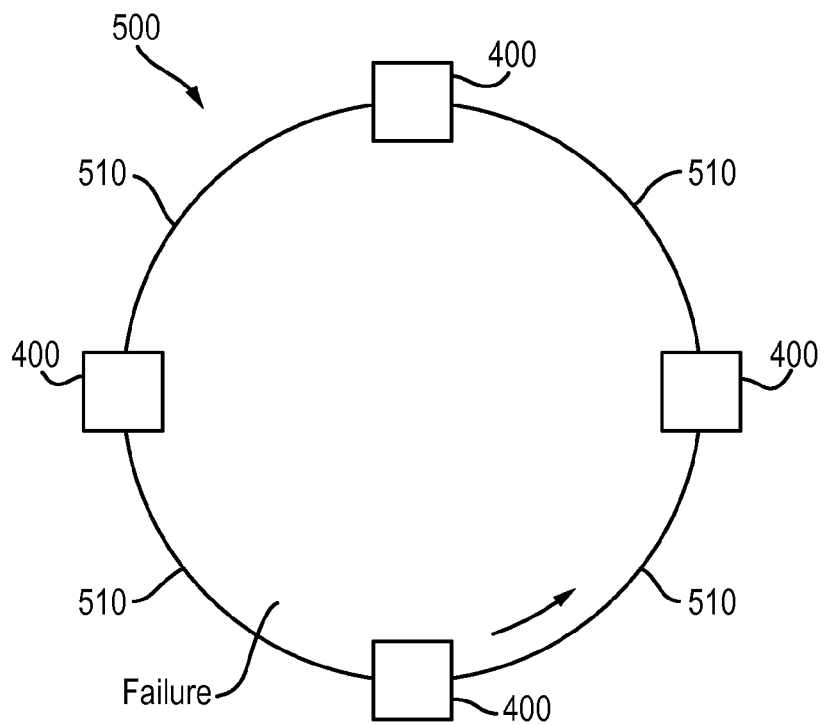

Thus, advantageously, an optical switch embodying the present invention may be used to provide restoration of the node 400 in the event of a failure on one of the optical links. For example, the optical switch may be used to switch output of an optical signal from for example the EAST port to the WEST port 410. This functionality is illustrated in FIGS. 5a and 5b which show an optical network 500 comprising a plurality of nodes 400 connected by a plurality of optical links 510 before and after such restoration. In the example, the network 500 has a ring topology, and if an optical signal is output from the EAST port it travels in an anticlockwise direction around the ring, and if the optical signal is output from the WEST port it travels in a clockwise direction around the ring. However, other topologies are feasible, as will be understood by those skilled in the art.

Thus, it will be appreciated that embodiments of the present invention are particularly advantageous in respect of optical networks, and in particular radio access networks. However, embodiments of the present invention may also be advantageous in other applications. Embodiments of the present invention have the advantage of providing an optical switch capable of switching an optical signal to travel in a first direction or a second direction, opposite to the first direction, through an optical waveguide, in a more cost efficient, power efficient and space efficient manner than other optical switches.

The invention claimed is:

1. An optical switch comprising:
   a first optical waveguide having:
      a first end;
      a second end; and
      a curved configuration including a vertex between the first end and the second end,
      wherein an optical signal introduced at the first end of the first optical waveguide travels in a first direction from the first end of the first optical waveguide along the first optical waveguide towards the second end of the first optical waveguide;
   a second optical waveguide having:
      a first end; and
      a second end;
   a first optical ring resonator arranged between a first side of the first optical waveguide and a first side of the second optical waveguide, wherein the first optical ring resonator is in close enough proximity to the first side of the first optical waveguide at a first point of adjacency to divert an optical signal travelling along the first optical waveguide in the first direction into the first optical ring resonator, and wherein the first optical ring resonator is in close enough proximity to the first side of the second optical waveguide at a second point of adjacency to output the optical signal to the second optical waveguide such that the optical signal travels in a second direction defined from the first end of the second optical waveguide along the second optical waveguide towards the second end of the second optical waveguide, and wherein the first point of adjacency is on a first side of the vertex; and
   a second optical ring resonator arranged between the first side of the first optical waveguide and a second side of the second optical waveguide, wherein the second optical ring resonator is in close enough proximity to the first side of the first optical waveguide at a third point of adjacency to divert an optical signal travelling along the first optical waveguide in the first direction into the second optical ring resonator, and wherein the second optical ring resonator is in close enough proximity to the second side of the second optical waveguide at a fourth point of adjacency to output the optical signal to the second optical waveguide such that the optical signal travels in a third direction defined from the second end of the second optical waveguide along the second optical waveguide towards the first end of the second optical waveguide, and wherein the third point of adjacency is on a second side of the vertex, different from the first side of the vertex.

2. The optical switch according to claim 1, wherein the second optical ring resonator is provided downstream of the first optical ring resonator in the first direction along the first optical waveguide.

3. The optical switch according to claim 1, wherein the first optical ring resonator has an active state in which it is configured to couple the optical signal travelling in the first direction along the first optical waveguide to the second optical waveguide and an inactive state in which it is configured not to couple the optical signal, the optical switch further comprising a first control element configured to cause the first optical ring resonator to switch between the active and inactive states in response to a control signal.

4. The optical switch according to claim 3, wherein the first control element comprises a heating element operable to change the temperature of the first optical ring resonator.

5. The optical switch according to claim 3, wherein the second optical ring resonator has an active state in which it is configured to couple the optical signal travelling in the first direction along the first optical waveguide to the second optical waveguide and an inactive state in which it is configured not to couple the optical signal, the optical switch further comprising a second control element configured to cause the second optical ring resonator to switch between the active and inactive states in response to a control signal.

6. The optical switch according to claim 5, further comprising control circuitry configured to cause the second optical ring resonator to switch between its active and inactive states in accordance with the switching of the first optical ring resonator between its active and inactive states.

7. The optical switch according to claim 5, wherein the second control element comprises a heating element operable to change the temperature of the second optical ring resonator.

8. The optical switch according to claim 1, wherein the first optical waveguide comprises an input for receiving an optical signal to travel in the first direction along the first optical waveguide.

9. The optical switch according to claim 1, wherein the second optical waveguide has a first output for outputting an optical signal travelling in the second direction along the second optical waveguide and a second output for outputting an optical signal travelling in the third direction along the second optical waveguide.

10. The optical switch according to claim 9, wherein the first output is spaced from the second output.

11. The optical switch according to claim 10, wherein the first output is provided at the first end of the second optical waveguide and the second output is provided at the second end of the second optical waveguide.

12. An optical switch according to claim 1, wherein the optical switch is made from a semiconductor material.

13. An optical network node comprising an optical switch according to claim 1.

14. An optical network comprising an optical switch according to claim 1.

* * * * *